Sept. 19, 1950 J. W. HAMMOND 2,522,870

PHONOGRAPH PICKUP SYSTEM

Filed Sept. 30, 1946

Inventor

JOHN W. HAMMOND

By Robert T. Killman

Attorney

Patented Sept. 19, 1950

2,522,870

UNITED STATES PATENT OFFICE 2,522,870

PHONOGRAPH PICKUP SYSTEM

John W. Hammond, Towson, Md., assignor to Bendix Aviation Corporation, Towson, Md., a corporation of Delaware Application September 30, 1946, Serial No. 700,270

2 Claims. (Cl. 179—100.4)

This invention relates to phonograph pickups and more particularly to a signal translating system forming a part of a capacitor type pickup.

The capacitor type of phonograph pickup provides a means of electronic control in which the mass required in the moving element of the mechanical conversion means is reduced to a minimum. Such small mass makes possible a frequency response considerably higher than is possible with a heavier moving mass of previous pickup elements. Less stylus pressure is required for the lighter moving element, resulting in diminished record wear and record noise. However, the use of this type of pickup has, in the past, entailed the provision of a separate oscillator for the phonograph, which was usually positioned in the tone arm, pickup head, or associated chassis.

An object of this invention is to provide a phonograph pickup in which the moving element constitutes a minimum of mass.

A further object of this invention is to provide a phonograph pickup which requires a minimum of stylus pressure to secure adequate tracking with the record groove.

Another object of this invention is to provide a phonograph pickup which requires a minimum of added circuit components in direct association with the pickup head.

A still further object of this invention is to provide a phonograph pickup circuit which, when employed in conjunction with a radio receiver, can utilize an energy source which is a normal component of the receiver.

Still another object of this invention is to provide a phonograph pickup circuit in which the power output is ample and requires a minimum of amplification to reach any desired output level.

The foregoing objects are accomplished by the use of a phonograph stylus to change the division of voltage in a balanced tuned circuit which is energized by a remotely located R.-F. oscillator. The unbalanced energy is then rectified and added for the resultant audio output, which will correspond to the actuation of the stylus in a record groove.

Figure 1:
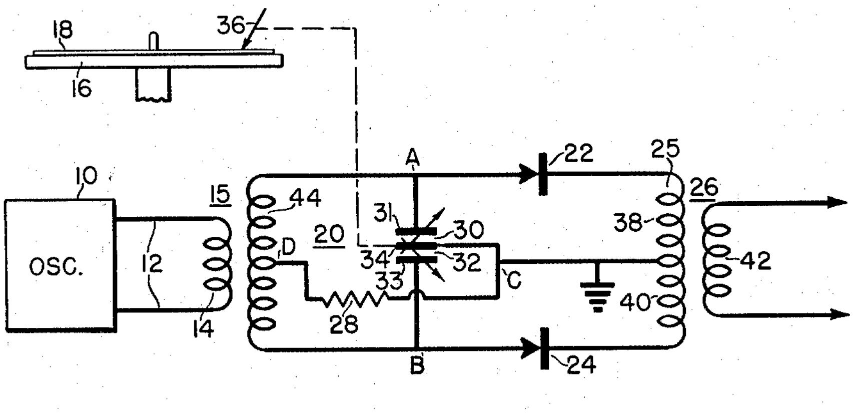
Figure 2:
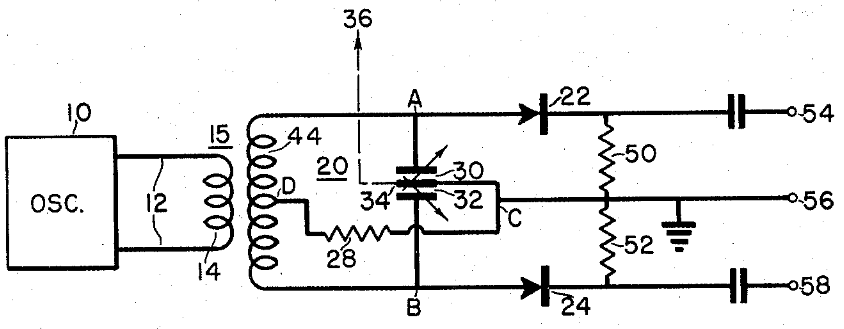

Other objects and advantages of this invention will become apparent upon consideration of the following specifications in conjunction with the accompanying drawing, in which:

Figure 1 is a diagram of a circuit embodying the invention and having a transformer output, and Figure 2 is a diagram of a circuit embodying the invention and including a voltage output means.

Figure 1 is a diagram of a circuit comprising a radio frequency oscillator 10, the output of which is applied to a low impedance feed line 12, which terminates in an inductor 14, forming the primary of a transformer 15. A turntable 16 is shown, upon which is supported a phonograph record 18. A stylus having a body portion 34 and a point 36 is illustrated, the point being shown as in playing contact with the record and the body as forming a common electrode with respect to two condenser plates 31 and 33 and forming therewith two condenser sections 30 and 32. The plates 31 and 33 are connected to respective terminals of an inductor 44 which constitutes the secondary of transformer 15 and are also connected respectively through rectifiers 22 and 24 to an inductor 25 forming the primary of a transformer 26 of which coil 42 is the secondary. Primary 25 is center tapped to form two sections 38 and 40, the tap being grounded and being connected to the stylus body 34 and to the center tap of inductor 44 through resistor 28. It should be understood that, though the stylus is shown in two portions for clarity of illustration, the body portion being represented as a conventionalized condenser plate, the stylus can be a conventional type of unitary and cylindrical form, and would normally be of such form.

In operation, the inductor 44 and condenser sections 30 and 32 constitute a tank circuit 20 which is resonant to the same, or nearly the same, frequency as the oscillator 10. Energy is provided to the tank circuit through feed line 12 and transformer 15 of which inductor 14 acts as the primary winding. The capacitive element of tank 20 consists of the two condenser sections 30 and 32 which operate in series. The body 34 of the phonograph stylus is common to both capacitor sections 30 and 32 and constitutes a point of division of the R.-F. potential acting across the two capacitor sections in series.

When the phonograph stylus 34 is at rest the R.-F. voltage across capacitor section 30 will equal that across section 32. If voltage readings be taken between points A, B, and C, voltage AC will equal BC and the two halves DAC and DBC of tank 20 will be balanced. In such balanced condition there will be a balanced and steady current flow in section 38 and section 40 of the output transformer 26, with no resulting output in secondary 42.

When the stylus body 34 is actuated to progressively increase the capacitance of section 30 and contrariwise progressively decrease that of section 32, the impedance of section 30 will decrease while that of section 32 will increase. The result will be that the R.-F. voltage AC will diminish to a lesser value than that of BC and the current flowing from B through rectifier 24 and primary section 40 of the output transformer 26 back to C will progressively increase while the current flowing from A through rectifier 22 and primary section 38 will correspondingly decrease. During displacement of the stylus voltage will appear across secondary 42. When the stylus body 34 swings in the opposite direction, the impedance of section 30 will increase and that at section 32 will decrease unbalancing the currents in the primary of output transformer 26 in the opposite direction and producing a voltage of opposite polarity in secondary 42. When the stylus is thus actuated at an audio frequency rate, the current output will be at the same audio frequency. Resistor 28, connecting point C to D, completes the path for direct current flow back to coil 44 in which the energy originates by induction from coil 14. Point D is the midpoint of coil 44.

Figure 2 is identical to Figure 1 with the exception that the output transformer 26 is eliminated and in its place resistors 50, 52 complete the paths of direct current flow. The terminals 54, 56, 58 provide appropriate outputs to drive a push-pull amplifier with terminal 56 being the common cathode connection, and terminals 54, 58 the grid connections.

The impedance unbalance caused by actuation of the stylus body 34 will unbalance the currents flowing from point A through rectifier 22 and resistor 50 to point C, and from point B through rectifier 24 and resistor 52 to point C. The voltage difference caused by the unbalance of currents through the resistors, 50, 52 appears on terminals 54 and 58 in accord with the audio pattern applied to the stylus 34, 36.

The oscillator 10 may be remotely located if desired and may, if the phonograph is part of a radio phonograph combination, be the local oscillator of the radio set. Even for a small amount of output power from the oscillator, the audio frequency voltage output of the pickup will be ample.

While the disclosure has been restricted to the embodiments of the invention which are now preferred, many variations thereof falling within the scope of the invention as defined by the appended claims, will occur to those skilled in the art. The scope of the invention is, therefore, not to be considered as limited to the embodiments disclosed.

What is claimed is:

1. A phonograph pickup system comprising a source of radio frequency oscillations, a parallel resonant circuit tuned to substantially the frequency of said oscillations coupled to the output of said source, a stylus adapted to follow the variations of a phonograph record groove, a pair of capacitor plates positioned on opposite sides of said stylus and forming therewith a variable capacitor, said capacitor forming a part of said circuit, means rendering said stylus electrically neutral, means rectifying the voltages appearing between said stylus and each of said plates and means deriving from said rectified voltages a resultant current flow varying in direction and magnitude with the direction and degree of unbalance between said voltages.

2. A phonograph pickup system comprising a source of radio frequency oscillations, a parallel resonant circuit tuned to substantially the frequency of said oscillations and coupled to the output of said source, said circuit including a parallel electrode capacitor having an intermediate electrode, means displacing said intermediate electrode with respect to the remaining electrodes of said capacitor in response to the variations of a phonograph record groove, means rendering said intermediate electrode electrically neutral, means rectifying the voltages between said intermediate electrode and each of said remaining electrodes and means differentially combining said rectified voltages.

JOHN W. HAMMOND.

REFERENCES CITED

The following references are of record in the file of this patent:

UNITED STATES PATENTS

| Number | Name | Date |
|---|---|---|
| 1,817,612 | Craig | Aug. 4, 1931 |
| 2,382,461 | Antalek | Aug. 15, 1945 |
| 2,386,049 | Hausz | Oct. 2, 1945 |
| 2,404,026 | Beard | July 16, 1946 |
| 2,408,695 | Sinnett | Oct. 1, 1946 |